US010846098B2

(12) United States Patent
Airaud et al.

(10) Patent No.: US 10,846,098 B2
(45) Date of Patent: Nov. 24, 2020

(54) EXECUTION PIPELINE ADAPTATION

(71) Applicant: Arm Limited, Cambridge (GB)

(72) Inventors: Cédric Denis Robert Airaud, Saint Laurent du Var (FR); Luca Nassi, Antibes (FR); Damien Robin Martin, Cagnes-sur-Mer (FR); Xiaoyang Shen, Valbonne (FR)

(73) Assignee: Arm Limited, Cambridge (GB)

( * ) Notice: Subject to any disclaimer, the term of this patent is extended or adjusted under 35 U.S.C. 154(b) by 91 days.

(21) Appl. No.: 15/990,953

(22) Filed: May 29, 2018

(65) Prior Publication Data
US 2019/0370004 A1 Dec. 5, 2019

(51) Int. Cl.
*G06F 9/38* (2018.01)
*G06F 9/30* (2018.01)

(52) U.S. Cl.
CPC ........ *G06F 9/3873* (2013.01); *G06F 9/30138* (2013.01); *G06F 9/30145* (2013.01); *G06F 9/3838* (2013.01)

(58) Field of Classification Search
CPC ............... G06F 9/3873; G06F 9/30145; G06F 9/30138; G06F 9/3838; G06F 9/3836
See application file for complete search history.

(56) References Cited

U.S. PATENT DOCUMENTS

| | | | | |
|---|---|---|---|---|
| 5,604,878 A | * | 2/1997 | Colwell | G06F 9/3836 710/6 |
| 7,478,225 B1 | * | 1/2009 | Brooks | G06F 9/3836 712/214 |
| 7,865,698 B1 | * | 1/2011 | Purcell | G06F 9/30145 712/208 |
| 2007/0055851 A1 | * | 3/2007 | Leijten | G06F 9/30058 712/228 |
| 2008/0313435 A1 | * | 12/2008 | Orion | G06F 9/3836 712/217 |
| 2017/0242624 A1 | * | 8/2017 | Patel | G06F 3/067 |

* cited by examiner

*Primary Examiner* — Farley Abad
(74) *Attorney, Agent, or Firm* — Nixon & Vanderhye P.C.

(57) ABSTRACT

An apparatus and method of data processing are provided. The apparatus comprises at least two execution pipelines, one with a shorter execution latency than the other. The execution pipelines share a write port and issue circuitry of the apparatus issues decoded instructions to a selected execution pipeline. The apparatus further comprises at least one additional pipeline stage and the issue circuitry can detect a write port conflict condition in dependence on a latency indication associated with a decoded instruction which it is to issue. If the issue circuitry intends to issue the decoded instruction to the execution pipeline with the shorter execution latency then when the write port conflict condition is found the issue circuitry will cause use of at least one additional pipeline stage in addition to the target execution pipeline to avoid the write port conflict.

17 Claims, 6 Drawing Sheets

EXECUTION PIPELINE ADAPTATION

TECHNICAL FIELD

The present disclosure relates to data processing systems. In particular, the present disclosure relates to data processing systems having execution pipelines.

DESCRIPTION

In a data processing apparatus for performing data processing operations the apparatus may be provided with multiple execution pipelines which share a write port. This may be a cost-effective arrangement, when those multiple execution pipelines are expected, in the main, not to pass executed instructions to the write port in the same execution cycle, and noting the relatively high cost of providing write ports. However, when in the same execution cycle two execution pipelines do complete execution of instructions which have passed through them respectively, then typically one executed instruction takes priority over the other, gaining the use of the write port, and the other instruction is cancelled and replayed.

SUMMARY

In one example embodiment described herein there is an apparatus comprising: at least two execution pipelines, wherein at least one execution pipeline has a shorter execution latency than another execution pipeline; a write port shared by the at least two execution pipelines; issue circuitry to receive at least a decoded instruction part and to issue the at least a decoded instruction part to a selected execution pipeline of the at least two execution pipelines for execution; and at least one additional pipeline stage, wherein the issue circuitry is arranged to detect a write port conflict condition in dependence on a latency indication associated with the at least a decoded instruction part, and wherein, when the selected execution pipeline has the shorter execution latency, the issue circuitry is responsive to detection of the write port conflict condition to cause the at least a decoded instruction part to proceed through the at least one additional pipeline stage in addition to the selected execution pipeline.

In one example embodiment described herein there is a method of data processing comprising: operating at least two execution pipelines, wherein at least one execution pipeline has a shorter execution latency than another execution pipeline; receiving at least a decoded instruction part; detecting a write port conflict condition in dependence on a latency indication associated with the at least a decoded instruction part; issuing the at least a decoded instruction part to a selected execution pipeline of the at least two execution pipelines for execution; and in response to detection of the write port conflict condition, when the selected execution pipeline has the shorter execution latency, causing the at least a decoded instruction part to proceed through at least one additional pipeline stage in addition to the selected execution pipeline.

In one example embodiment described herein there is an apparatus comprising: at least two execution pipelines, wherein at least one execution pipeline has a shorter execution latency than another execution pipeline; means for receiving at least a decoded instruction part; means for detecting a write port conflict condition in dependence on a latency indication associated with the at least a decoded instruction part; means for issuing the at least a decoded instruction part to a selected execution pipeline of the at least two execution pipelines for execution; and means for causing the at least a decoded instruction part to proceed through at least one additional pipeline stage in addition to the selected execution pipeline in response to detection of the write port conflict condition when the selected execution pipeline has the shorter execution latency.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
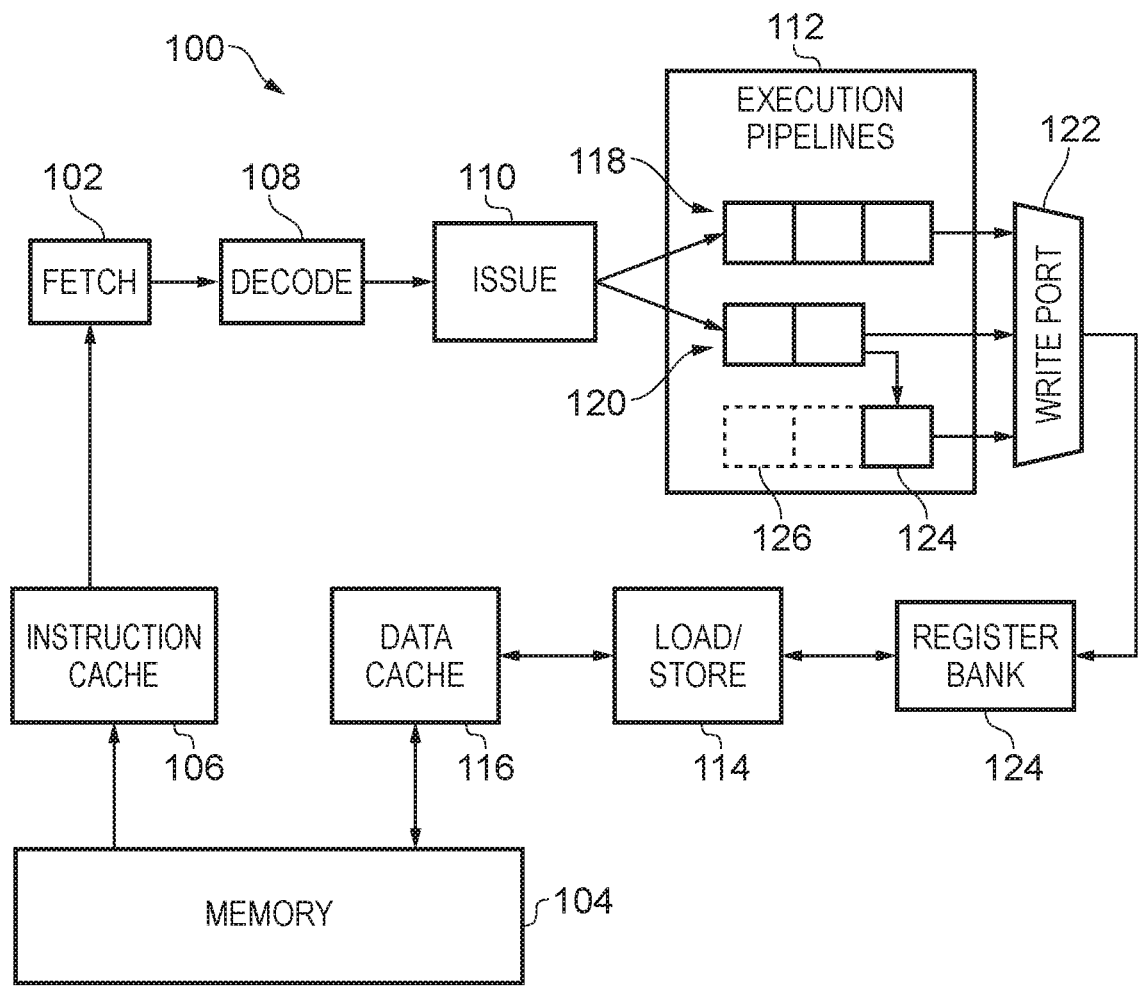
FIG. 1 schematically illustrates an apparatus in one example embodiment.

Before discussing the embodiments with reference to the accompanying figures, the following description of embodiments is provided.

In accordance with one example configuration there is provided an apparatus comprising: at least two execution pipelines, wherein at least one execution pipeline has a shorter execution latency than another execution pipeline; a write port shared by the at least two execution pipelines; issue circuitry to receive at least a decoded instruction part and to issue the at least a decoded instruction part to a selected execution pipeline of the at least two execution pipelines for execution; and at least one additional pipeline stage, wherein the issue circuitry is arranged to detect a write port conflict condition in dependence on a latency indication associated with the at least a decoded instruction part, and wherein, when the selected execution pipeline has the shorter execution latency, the issue circuitry is responsive to detection of the write port conflict condition to cause the at least a decoded instruction part to proceed through the at least one additional pipeline stage in addition to the selected execution pipeline.

An apparatus which executes instructions by means of execution pipelines may have more execution pipelines than write ports. In other words at least two execution pipelines will share a write port. This makes sense when the cost of providing a write port is borne in mind, as well as the fact that instructions will commonly not complete their progression through parallel execution pipelines at the same time, allowing one write port to be used for more than one execution pipeline. However, conflicts between pipelines which share a write port can still be relatively common and when such a conflict occurs one instruction is typically cancelled and "replayed" (i.e. reissued to its execution pipeline). The present techniques however recognise that a different approach to this issue may be taken according to which the issue circuitry associated with the execution pipelines is arranged to detect a (potential) write port conflict condition relative to the at least two execution pipelines to which it issues decoded instructions. This is brought about by examination of a latency indication associated with the decoded instructions which the issue circuitry issues to the execution pipelines. That is to say, the issue circuitry can determine the latency (i.e. the number of cycles) which will elapse between the instruction being issued to a given execution pipeline and it exiting that pipeline and needing to make use of the write port. Accordingly the issue circuitry can detect the situation in which a decoded instruction which should next be issued to one of the execution pipelines is to be issued to an execution pipeline with a shorter execution latency than another execution pipeline to which a decoded instruction has recently been issued. In this circumstance it can be recognised that the later decoded instruction issued to the shorter execution latency pipeline can therefore "catch up with" the earlier issued instruction to the longer execution latency pipeline, such that both instructions will reach the write port in the same cycle. The apparatus is arranged such that the issue circuitry can cause the later issued instruction to proceed through at least one additional pipeline stage in addition to the "regular" execution pipeline through which it must proceed, thus ensuring that it is delayed (e.g. by a cycle) with respect to the earlier issued instruction. The potential conflict at the write port is thus avoided.

The at least one additional pipeline stage may be variously provided in the apparatus. In some embodiments the apparatus further comprises a further execution pipeline comprising plural pipeline stages in addition to the at least two execution pipelines, wherein the further execution pipeline comprises the at least one additional pipeline stage. Hence for example the further execution pipeline may simply be another execution pipeline amongst several execution pipelines in the apparatus, where the issue circuitry knows that this execution pipeline is either currently not in use or at least the at least one additional pipeline stage thereof is not currently in use or rather will not be in use when the about-to-be issued instruction reaches it. This existing structure of the apparatus can therefore be used to implement the present techniques, thus supporting an efficient implementation without significant further area requirement.

The at least one additional pipeline stage does not however need to be provided by an execution pipeline of the same or similar type to the at least two execution pipelines and in some embodiments the apparatus further comprises a data propagation structure associated with the at least two execution pipelines, wherein the data propagation structure comprises the at least one additional pipeline stage. This data propagation structure may take a variety of forms, but in some embodiments the data propagation structure is an accumulation pipeline.

Such an accumulation pipeline may for example be provided in the apparatus in order to receive data from an execution pipeline (for accumulation purposes) and accordingly in some embodiments at least one stage of the accumulation pipeline is arranged to receive data output from at least one of the at least two execution pipelines.

The at least one additional pipeline stage may be provided in other ways and in some embodiments the at least one additional pipeline stage is an extension to at least one of the at least two execution pipelines, and wherein the issue circuitry is responsive to absence of the write port conflict condition to cause the decoded instruction to bypass the at least one additional pipeline stage after passing through the selected execution pipeline. Conversely it will therefore be understood that in the presence of the write port conflict condition the decoded instruction will proceed through the at least one additional pipeline stage forming this extension to an execution pipeline.

In some embodiments one of the at least two execution pipelines comprises the at least one additional pipeline stage. This additional pipeline stage may form part of an execution pipeline in a variety of ways, for example as an initial (selectable) stage of the execution pipeline, as a intermediate (selectable) pipeline stage of the execution pipeline, or as a final (selectable) stage of the execution pipeline.

In such embodiments it may be the case that the execution pipeline which comprises the at least one additional pipeline stage has a longest execution latency of the at least two execution pipelines.

The issue circuitry may be arranged to determine the write port conflict condition in a variety of ways, but in some embodiments the issue circuitry comprises scoreboard circuitry to maintain pipeline stage occupancy indications, and the issue circuitry is responsive to a pipeline stage occupancy indication stored in the scoreboard circuitry which matches the latency indication associated with the decoded instruction to signal the write port conflict condition. Accordingly the issue circuitry, by use of the scoreboard circuitry, can predict the respective occupancies of the stages of the execution pipelines and therefore in particular identify a situation in which an about-to-be issued instruction will arrive at the write port simultaneously with an already issued instruction, i.e. identify the write port conflict condition.

In some embodiments the issue circuitry comprises plural issue stages and the issue circuitry is arranged to detect the write port conflict condition in an issue stage prior to a final issue stage of the plural issue stages. This may facilitate the selection of instructions to issue and the configuration of those issued instructions (i.e. in the present context with or without the use of the at least one additional pipeline stage).

The present techniques are not limited to a particular number of write ports and in some embodiments the apparatus further comprises at least one further write port shared by the at least two execution pipelines. Depending on the particular configuration of the apparatus there may be various situations in which the write port conflict condition could potentially arise even when the number of write ports matches the number of execution pipelines, for example when the configuration is such that at least two execution pipelines may need to use a selected write port. Alternatively, more generally, when the number of execution pipelines exceeds the number of write ports the potential for a write port conflict condition also arises. The present techniques are applicable in any of these example situations.

In some embodiments, the issue circuitry comprises at least two issue queues to receive decoded instructions and from which the decoded instructions are issued to selected execution pipelines of the at least two execution pipelines for execution. Either or both of the issue queues may be arranged to detect the write port conflict condition in the manner described herein.

The write port shared by the at least two execution pipelines may be arranged to write data to a variety of destinations depending on the particular implementation requirements, but in some embodiments the apparatus comprises a register bank comprising a plurality of registers, and wherein the write port shared by the at least two execution pipelines is arranged to write data to a register in the register bank.

The write port shared by the at least two execution pipelines may alternatively or in addition forward data to other destinations and in some embodiments the write port shared by the at least two execution pipelines is arranged to forward data to an execution pipeline of the at least two execution pipelines.

Accordingly, in some embodiments the apparatus comprises a register bank comprising a plurality of registers, wherein in response to at least one control signal associated with the decoded instruction, the write port shared by the at least two execution pipelines is arranged to select one of: a register in the register bank; and an execution pipeline of the at least two execution pipelines, as the target of the write port.

In accordance with one example configuration there is provided a method of data processing comprising: operating at least two execution pipelines, wherein at least one execution pipeline has a shorter execution latency than another execution pipeline; receiving at least a decoded instruction part; detecting a write port conflict condition in dependence on a latency indication associated with the at least a decoded instruction part; issuing the at least a decoded instruction part to a selected execution pipeline of the at least two execution pipelines for execution; and in response to detection of the write port conflict condition, when the selected execution pipeline has the shorter execution latency, causing the at least a decoded instruction part to proceed through at least one additional pipeline stage in addition to the selected execution pipeline.

In accordance with one example configuration there is provided an apparatus comprising: at least two execution pipelines, wherein at least one execution pipeline has a shorter execution latency than another execution pipeline; means for receiving at least a decoded instruction part; means for detecting a write port conflict condition in dependence on a latency indication associated with the at least a decoded instruction part; means for issuing the at least a decoded instruction part to a selected execution pipeline of the at least two execution pipelines for execution; and means for causing the at least a decoded instruction part to proceed through at least one additional pipeline stage in addition to the selected execution pipeline in response to detection of the write port conflict condition when the selected execution pipeline has the shorter execution latency.

Particular embodiments will now be described with reference to the figures.

FIG. 1 illustrates a data processing apparatus 100 in accordance with one embodiment. The apparatus 100 comprises fetch circuitry 102 which retrieves a sequence of instructions to be executed from the memory 104 where they are stored. These retrieved instructions can be cached in the instruction cache 106 to reduce the latency associated with retrieving repeatedly accessed instructions from the memory 104. Thus fetched the instructions are passed to the decode circuitry 108 for decoding and then to the issue circuitry 110. The issue circuitry 110 issues instructions to the execution pipelines 112 for execution. As part of the data processing operations carried out by the execution pipelines 112 in response to the instructions the load/store circuitry 114 may be made use of to retrieve data items from and return modified data items to the memory 104. A data cache 116 is provided to avoid the memory access latency mentioned above where possible. Two execution pipelines 118, 120 are shown noting that these comprise a different number of pipeline stages illustrating the differing execution latency of these execution pipelines. Specifically, execution pipeline 120 has a shorter execution latency than the execution pipeline 118. An instruction which has completed its transition through the pipeline stages of an execution pipeline (i.e. it has been fully executed) then passes to the write port 122 which writes modified values into one or more registers of the register bank 124. These modified values may then in turn be stored to memory 104 via the load/store circuitry 114. Note in particular that the execution pipelines 118, 120 share the write port 122 and therefore (absent the present techniques) the potential exists for a write port conflict to arise if the issue circuitry 110 issues an instruction to the execution pipeline 118 a pipeline cycle before issuing an instruction to the execution pipeline 120. The executed instructions would then seek to make use of the write port 122 in parallel, and one instruction would have to be cancelled and replayed. However, in accordance with the present techniques, note that the execution pipelines 112 further comprises an additional pipeline stage 124, which may itself form part of a further execution pipeline 126, although this is optional. As will be described in more detail with reference to the figures which follow, the issue circuitry 110 is arranged to identify a write port conflict condition indicating that executed instructions could complete their progression through the execution pipelines 118 and 120 in the same cycle and therefore that one executed instruction would have to be cancelled and replayed. It is under this circumstance that the issue circuitry 110 can cause a later issued instruction issued to the execution pipeline 120 to also make use of the additional pipeline stage 124 to avoid such conflict. This is described in more detail below. Finally, it will be appreciated that FIG. 1 is only a high level illustration of the configuration of the apparatus and is provided to facilitate an understanding of the principle of the present techniques and to put them in an example context. Accordingly various components of the apparatus are omitted for clarity of illustration, as are various communication paths between various of the illustrated components in FIG. 1.

Figure 2A:
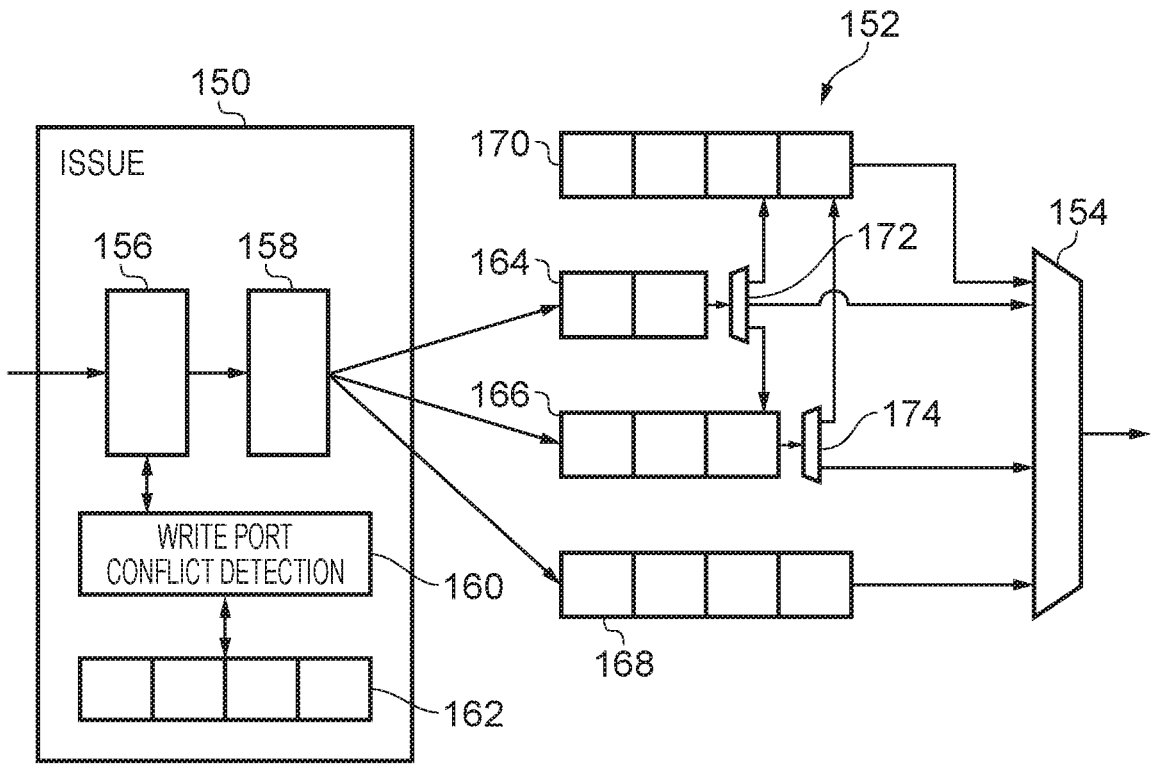
FIGS. 2A and 2B schematically illustrate data processing apparatuses in example embodiments.

FIG. 2A schematically illustrates issue circuitry 150, execution pipelines 152, and a write port 154 in an example embodiment. The issue circuitry 150 comprises two issue stages 156, 158 and for the issue stage 156 write port conflict detection circuitry 160 is activated to determine, with reference to the scoreboard 162, whether a write port conflict condition exists. Decoded instructions which reach the issue stage 158 are then issued to one of the execution pipelines 164, 166, 168 depending on availability and the suitability of the respective execution pipeline for that type of decoded instruction. The execution pipelines 152 as shown further comprise additional pipeline stages 170. The scoreboard 162 in the issue circuitry 150 maintains a record of recently issued instructions which are currently being processed by the execution pipelines 152 and their associated execution latency. Decoded instructions at the issue stage 156 comprise a latency indication, indicating how many pipeline stage cycles are expected to be required for the execution of the instruction. Thus, by comparison of this information with the scoreboard information the write port conflict detection circuitry 160 can determine if issuing the decoded instruction which is currently in the issue stage 156 (once it reaches issue stage 158) would be expected to result in that instruction seeking to make use of the write port 154 in the same cycle as an already issued, but still executing, instruction. In this situation, of the "write port conflict condition", the issue circuitry signals to the execution pipelines 152 that use of an additional pipeline stage must be made in addition to the selected execution pipeline to which this instruction is issued. This signalling may take place by means of additional information which accompanies an issued instruction to its execution pipeline. This selectable use of the additional pipeline stage is implemented by means of the multiplexers 172, 174. Multiplexer 174 can be controlled to pass the output of the execution pipeline 166 directly to the write port 154 or can be controlled to pass the output to the last stage of the set of additional pipeline stages 170. Similarly the multiplexer 172 can be controlled to pass the output of the execution pipeline 164 directly to the write port 154, or can be controlled to pass the output to the penultimate pipeline stage of the set of additional pipeline stages 170. Further the multiplexer 172 can be controlled to pass the output of the execution pipeline 164 to the final stage of the execution pipeline 166 from where it can then (under control of the multiplexer 174) either be passed directly to the write port 154 or to the final stage of the set of additional pipeline stages 170. The issue circuitry 150 can cause any of these routes to be taken depending on the availability of the respective stages. Generally, however, the use of at least one additional pipeline stage allows the potential write port conflict to be avoided.

Figure 2B:
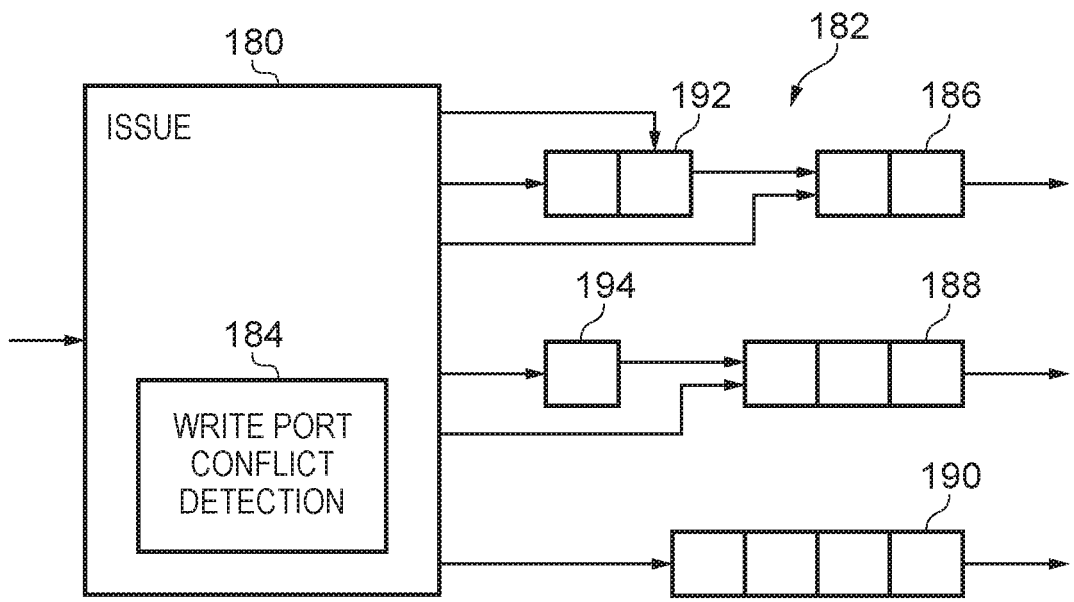

FIG. 2B schematically illustrates another example of issue circuitry 180 and execution pipelines 182. The issue circuitry 180 may for example be configured similarly to the issue circuitry 150 and is not further described in detail here. The execution pipelines 182 comprise execution pipelines 186, 188 and 190. The execution pipeline 190 has the longest execution latency (comprising four pipeline stages) and does not have any additional pipeline stages associated with it. The execution pipelines 186 and 188 have shorter execution latencies (of two and three pipeline stages respectively) and are associated with the additional pipeline stages 192 and 194 respectively. In this example these additional pipeline stages precede their associated execution pipelines. These additional pipeline stages are made use of by the issue circuitry 180 when issuing instructions for execution in that when the write port conflict detection circuitry 184 determines that the write port conflict condition exists the issue circuitry 180 can cause the instruction to be issued to one of the additional pipeline stages 192 or 194 in order to cause the progression of this instruction to take one or two more pipeline cycles to complete and therefore to avoid a write port conflict. Note that the issue circuitry 180 can selectively choose between making use of one or both of the additional pipeline stages 192 preceding the execution pipeline 186 depending on where the conflicting instruction currently is within the execution pipeline 188 or the execution pipeline 190.

Figure 3A:
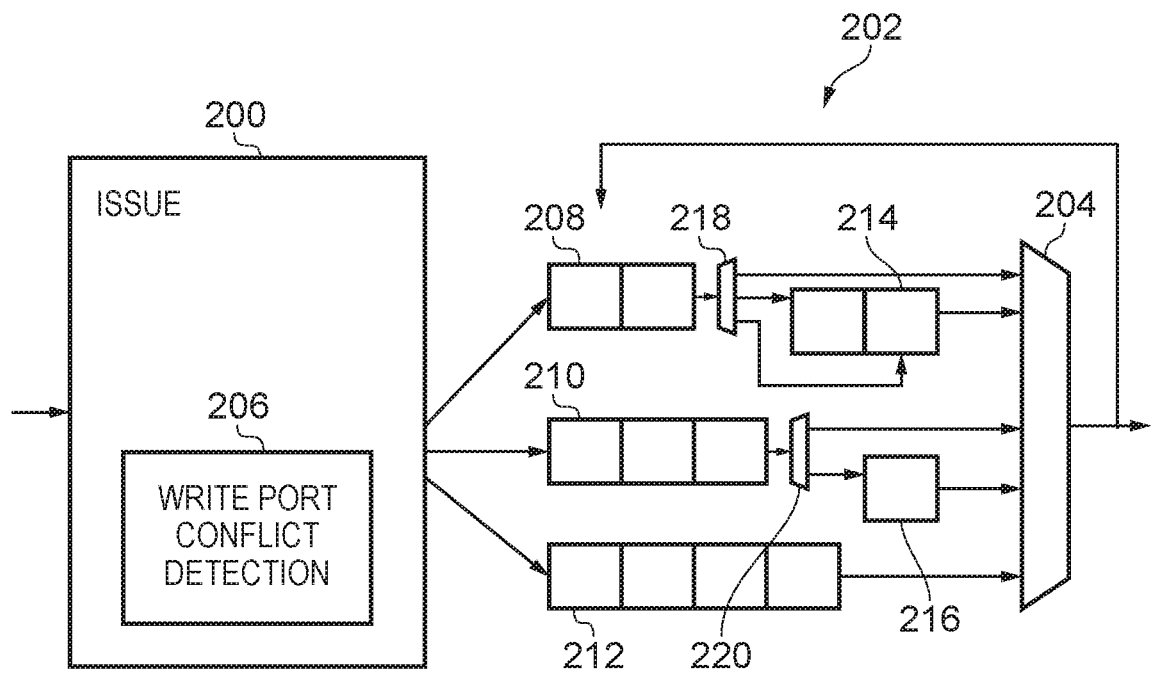
FIGS. 3A and 3B schematically illustrate data processing apparatuses in example embodiments.

FIG. 3A schematically illustrates issue circuitry 200, execution pipelines 202, and write port 204 in one example embodiment. Again, the issue circuitry 200 comprises write port conflict detection circuitry 206 which may for example be configured as discussed in more detail with reference to the issue circuitry 150 of FIG. 2A and further discussion thereof is dispensed herewith merely for the purpose of brevity. The execution pipelines 202 comprise execution pipelines 208, 210 and 212. A write port 204 is also illustrated. Additional pipeline stages 214 and 216 are provided to follow their respective execution pipelines 208, 210 in this example. Accordingly, it will be understood that the multiplexers 218, 220 are used (under the control of the issue circuitry 200) to cause an instruction which has completed progression through its respective execution pipeline to then either proceed directly to the write port 204, or to additionally pass through at least one additional pipeline stage. Selection of whether one or two additional pipeline stages are used in the case of multiplexer 218 depends on whether the conflict has been determined to arise with respect to execution pipeline 210 or execution pipeline 212, and the relative position of the conflicting instruction within that pipeline. Note also the feedback path following from the output of the write port 204. In the example of FIG. 3A this illustrates the fact that the write port can forward data to an execution pipeline of the execution pipelines 202.

Figure 3B:
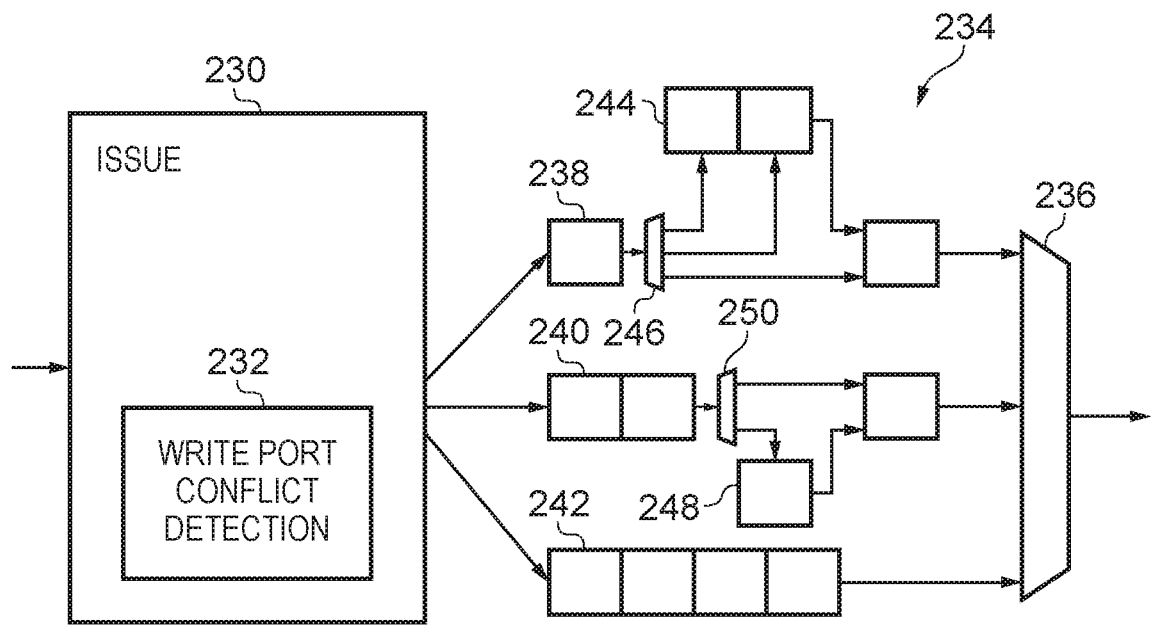

FIG. 3B schematically illustrates another example embodiment of issue circuitry, execution pipelines, and a write port. The issue circuitry 230 comprises write port conflict detection circuitry 232 and, as in the example of FIG. 3A, reference may be made to the example of FIG. 2A for one example configuration of that component. The execution pipelines 234 comprise execution pipelines 238, 240 and 242. These provide their outputs to the write port 236. In the example of FIG. 3B the additional pipeline stages are provided as intermediate pipeline stages for the execution pipelines 238 and 240. Accordingly, the additional pipeline stages 244 may be selected (by multiplexer 246, under the control of the issue circuitry 230) to form part of the execution pipeline 238. Similarly, the additional pipeline stage 248 may be selected by the multiplexer 250 (under control of the issue circuitry 230) to form part of the execution pipeline 240. In this manner one or two additional pipeline stages may be incorporated into the execution pipeline 238 and an additional pipeline stage may be incorporated into the execution pipeline 240. These additional pipeline stages are made use of when the write port conflict detection circuitry detects the write port conflict condition.

Figure 4A:
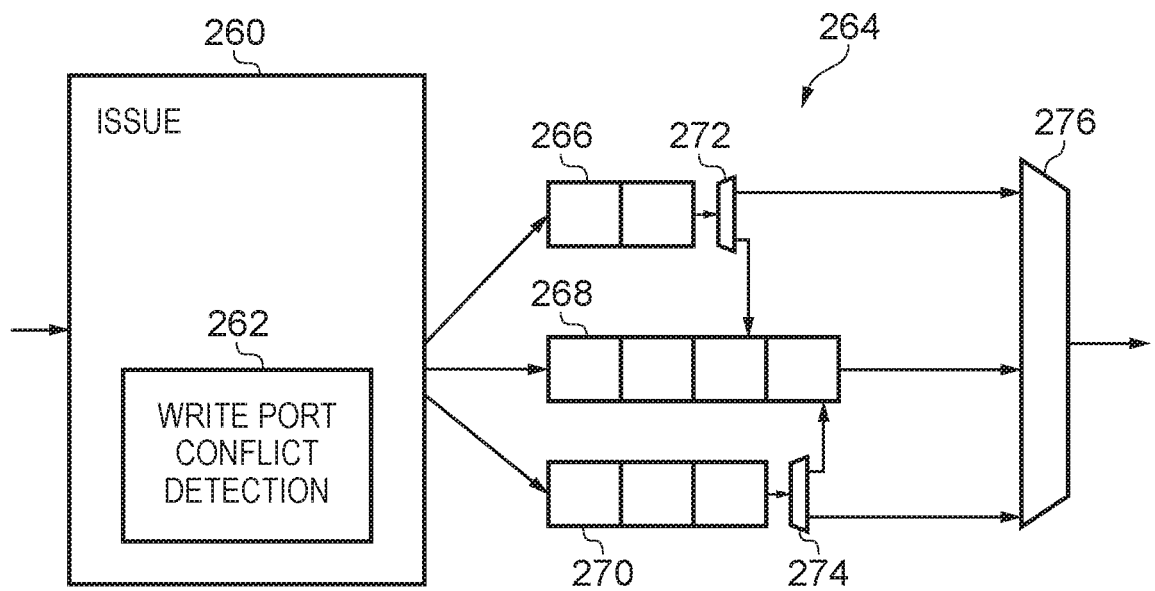
FIGS. 4A and 4B schematically illustrate data processing apparatuses in example embodiments.

FIG. 4A schematically illustrates a further example embodiment. Issue circuitry 260 and its write port conflict detection circuitry 262 may for example be configured and operated as described above with reference to the issue circuitry 150 of FIG. 2A. The execution pipelines 264 comprise execution pipelines 266, 268 and 270. Multiplexers 272 and 274 are provided at the output of the execution pipelines 266 and 270 respectively. These can either pass the output of their respective execution pipelines directly to the write port 276, or can be controlled (by the issue circuitry 260) to forward the output to a pipeline stage of the execution pipeline 268. Accordingly, it will be appreciated that the final stages of the execution pipeline 268 are therefore made use of in this example embodiment to provide the selectively used at least one additional pipeline stage. The write port conflict detection circuitry 262, for example with reference to scoreboard circuitry such as scoreboard circuitry 162 illustrated in FIG. 2A, can not only determine when a write port conflict condition exists, but also with reference to the occupancy and latency information provided by such a scorecard can also determine that the latter stages of the execution pipeline 268 will be available for use as an additional pipeline stage without conflicting with any instructions currently preceding through the execution pipeline 268. Accordingly, the multiplexer 272 can be controlled to cause the output of the execution pipeline 266 to be forwarded to the penultimate pipeline stage of execution pipeline 268, whilst the multiplexer 274 can be controlled to forward the output of the execution pipeline 270 into the final pipeline stage of the execution pipeline 268.

Figure 4B:
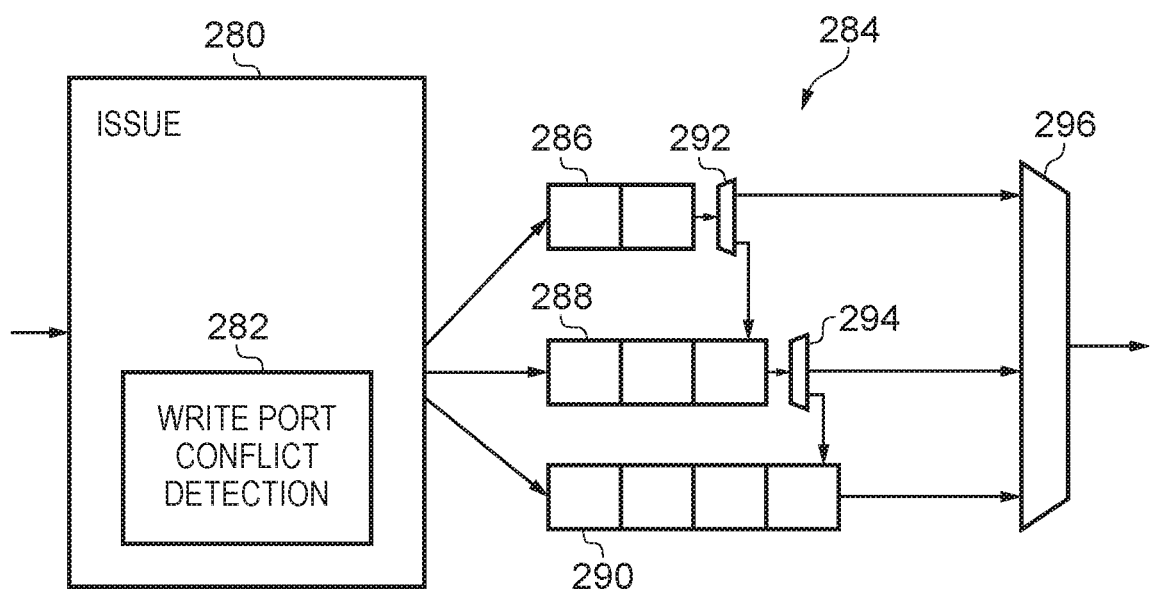

FIG. 4B schematically illustrates a variant on the example embodiment of FIG. 4A in which the forwarding from the output of one execution pipeline to another can be cascaded. Issue circuitry 280 and its write port conflict detection circuitry 282 can correspond to any of those discussed above. The execution pipelines 284 comprise execution pipelines 286, 288 and 290. In this example embodiment the output of the three pipeline stage execution pipeline 288, by means of the multiplexer 294, can either be forwarded directly to the write port 296 or can be forwarded to the final pipeline stage of the execution pipeline 290 in the same way that the output of execution pipeline 270 can be forwarded to the final pipeline stage of the execution pipeline 268 by means of the multiplexer 274 in the example of FIG. 4A. However, the output of the two stage execution pipeline 286, by means of the multiplexer 292, can either be forwarded directly to the write port 296 or can be forwarded to the final stage of the execution pipeline 288. From there, under the control of the multiplexer 294, the instruction can then either be forwarded directly to the write port 296 or can be diverted again to the final stage of the execution pipeline 290. Accordingly either one or two additional pipeline stages can be added to the execution pipeline 286.

Figure 5:
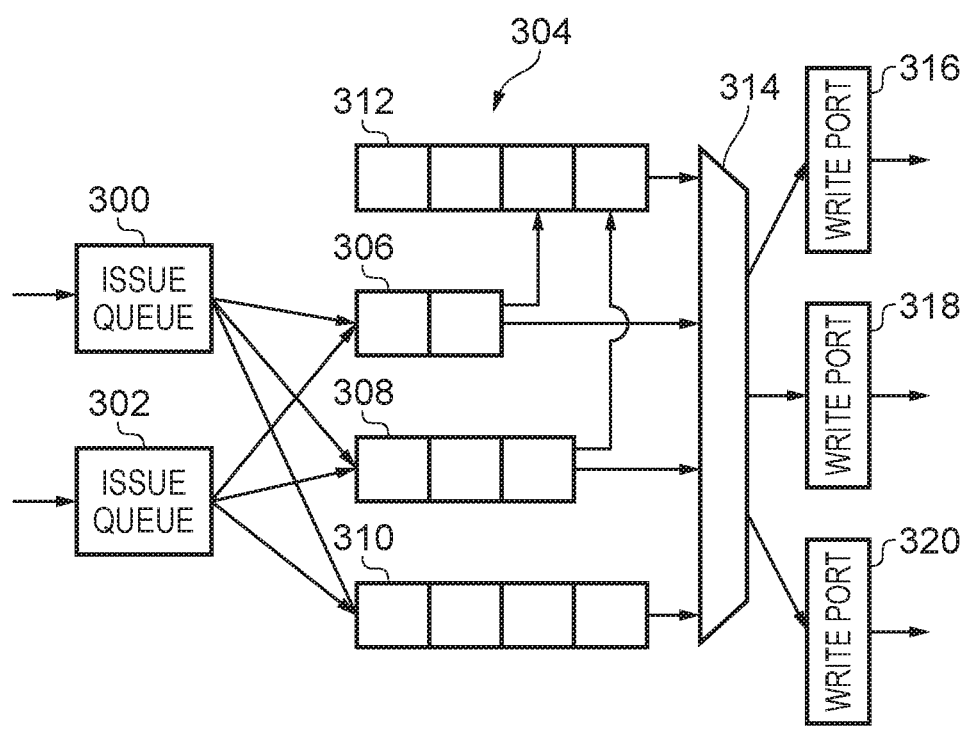
FIG. 5 schematically illustrates a data processing apparatus in an example embodiment.

FIG. 5 schematically illustrates an example embodiment with more than one issue queue and more than one write port. Two issue queues 300, 302 are shown. The execution pipelines 304 comprise execution pipelines 306, 308 and 310 and a further set of pipeline stages 312, which may for example be an accumulation pipeline, may be additional pipeline stages provided for the purpose of write port conflict avoidance, or may have some other purpose within the apparatus. Outputs of the execution pipelines 304 reach the multiplexer 314 which then directs the instruction to one of the three write ports 316, 318 and 320. In the illustration of FIG. 5 multiplexers at the output of execution pipelines 306, 308 are not explicitly illustrated merely for clarity of view. Further the issue queues 300, 302 are illustrated in FIG. 5 as issuing instructions to execution pipelines 306, 308 and 310 (and not to 312), but depending on the configuration of the set of pipeline stages 312, the issue queues 300, 302 may also issue instructions to that path 312 as well. Either or both of the issue queues 300, 302 may be configured for example as shown in the example issue circuitry 150 of FIG. 2A. Note that the example of FIG. 5 is merely exemplary and that the number of issue queues and write ports could vary, where the present techniques recognise that there are various conditions under which a write port conflict condition could arise and although more than one execution pipeline sharing a write port represents a clear example of a context in which this could occur, it is not a prerequisite that the number of execution pipelines exceeds the number of write ports, since it depends on the manner in which those write ports are used, the respective targets of their write operations, the nature of the respective execution pipelines, and so on.

Figure 6:
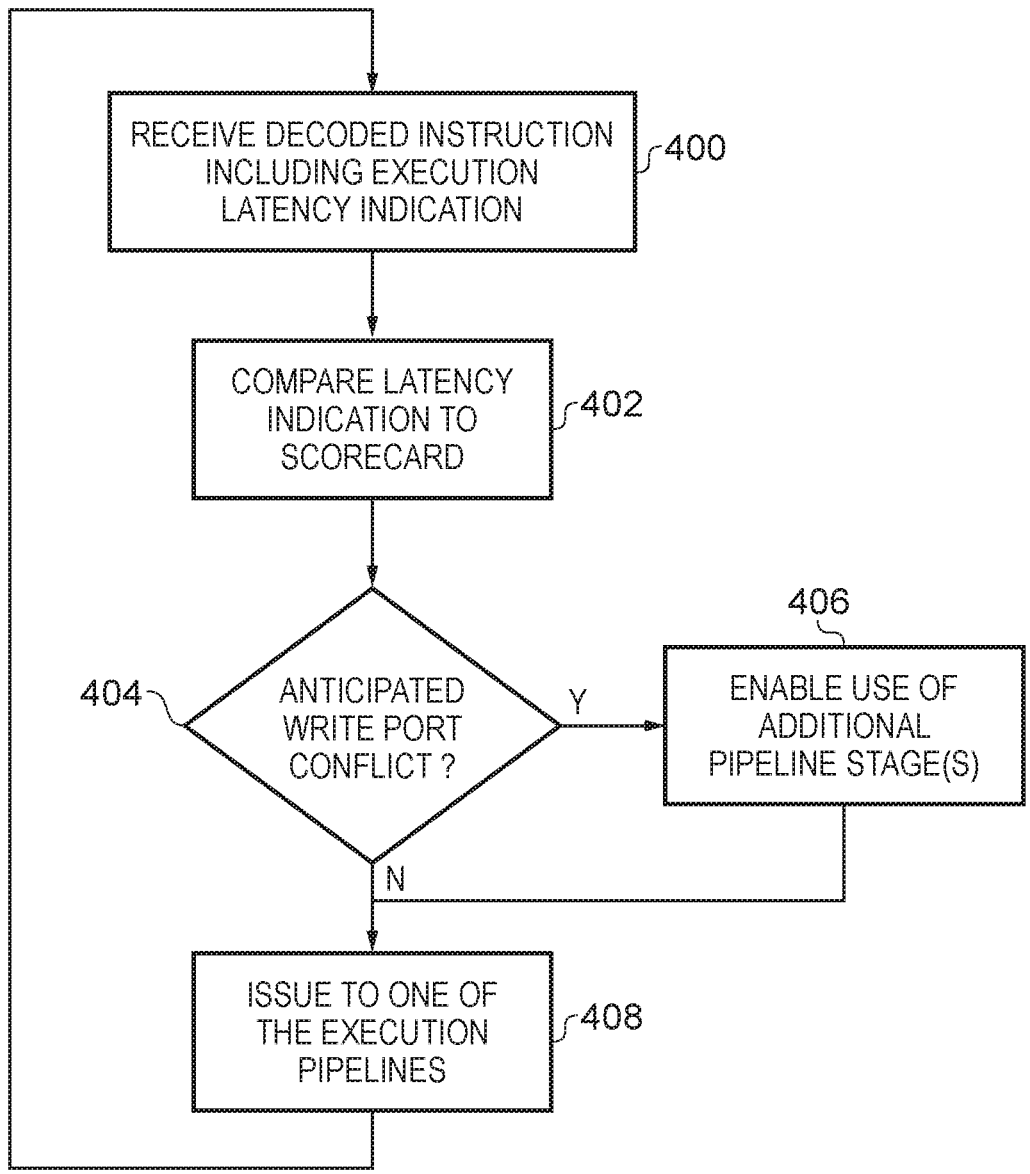
FIG. 6 is a flow diagram showing a sequence of steps which are taken in one example method embodiment.

FIG. 6 is a flow diagram showing an example set of steps which are carried out according to the method of one example embodiment. The flow can be considered to begin at step 400 where issue circuitry receives a decoded instruction which includes an indication of its execution latency (i.e. the number of pipeline cycles it will require to traverse the execution pipelines and reach the write port). Then at step 402 this latency indication is compared to the current content of a scorecard (showing the current occupancy of the execution pipelines) to which the issue circuitry has access. It is then determined at step 404 if a write port conflict is anticipated, i.e. if issuance of this decoded instruction would be expected to cause that decoded instruction to complete execution and reach the write port in the same pipeline cycle as a previously issued instruction which is still "in flight" through the execution pipelines. If such a write port conflict is anticipated (i.e. a write port conflict condition is detected) then the flow proceeds via step 406 where the issue circuitry enables the use of at least one additional pipeline stage for this decoded instruction. Otherwise the flow proceeds directly to step 408. At step 408 the issue circuitry issues the decoded instruction to one of the execution pipelines. If the flow has proceeded via the step 406 then execution of the decoded instruction in its execution pipeline will make use of the at least one additional pipeline stage in order to delay completion of this decoded instruction and avoid the write port conflict.

In brief overall summary an apparatus and method of data processing are provided. The apparatus comprises at least two execution pipelines, one with a shorter execution latency than the other. The execution pipelines share a write port and issue circuitry of the apparatus issues decoded instructions to a selected execution pipeline. The apparatus further comprises at least one additional pipeline stage and the issue circuitry can detect a write port conflict condition in dependence on a latency indication associated with a decoded instruction which it is to issue. If the issue circuitry intends to issue the decoded instruction to the execution pipeline with the shorter execution latency then when the write port conflict condition is found the issue circuitry will cause use of at least one additional pipeline stage in addition to the target execution pipeline to avoid the write port conflict.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
at least two execution pipelines, wherein at least one execution pipeline has a shorter execution latency than another execution pipeline;
a write port shared by the at least two execution pipelines;
issue circuitry to receive at least a decoded instruction part and to issue the at least a decoded instruction part to a selected execution pipeline of the at least two execution pipelines for execution; and
at least one additional pipeline stage,
wherein the issue circuitry is arranged to detect a write port conflict condition in dependence on a latency indication associated with the at least a decoded instruction part,
wherein, when the selected execution pipeline has the shorter execution latency, the issue circuitry is responsive to detection of the write port conflict condition to cause the at least a decoded instruction part to proceed through the at least one additional pipeline stage in addition to the selected execution pipeline, and wherein the at least one additional pipeline stage corresponds to a stage of an execution pipeline different from the execution pipeline that has the shorter execution latency.

2. The apparatus as claimed in claim 1, further comprising:
a further execution pipeline comprising plural pipeline stages in addition to the at least two execution pipelines, wherein the further execution pipeline comprises the at least one additional pipeline stage.

3. The apparatus as claimed in claim 1, further comprising:
a data propagation structure associated with the at least two execution pipelines, wherein the data propagation structure comprises the at least one additional pipeline stage.

4. The apparatus as claimed in claim 3, wherein the data propagation structure is an accumulation pipeline.

5. The apparatus as claimed in claim 4, wherein at least one stage of the accumulation pipeline is arranged to receive data output from at least one of the at least two execution pipelines.

6. The apparatus as claimed in claim 1, wherein the at least one additional pipeline stage is an extension to at least one of the at least two execution pipelines, and wherein the issue circuitry is responsive to absence of the write port conflict condition to cause the decoded instruction to bypass the at least one additional pipeline stage after passing through the selected execution pipeline.

7. The apparatus as claimed in claim 6, wherein the execution pipeline which comprises the at least one additional pipeline stage has a longest execution latency of the at least two execution pipelines.

8. The apparatus as claimed in claim 1, wherein one of the at least two execution pipelines comprises the at least one additional pipeline stage.

9. The apparatus as claimed in claim 1, wherein the issue circuitry comprises scoreboard circuitry to maintain pipeline stage occupancy indications, and the issue circuitry is responsive to a pipeline stage occupancy indication stored in the scoreboard circuitry which matches the latency indication associated with the decoded instruction to signal the write port conflict condition.

10. The apparatus as claimed in claim 1, wherein the issue circuitry comprises plural issue stages and the issue circuitry is arranged to detect the write port conflict condition in an issue stage prior to a final issue stage of the plural issue stages.

11. The apparatus as claimed in claim 1, further comprising at least one further write port shared by the at least two execution pipelines.

12. The apparatus as claimed in claim 1, wherein the issue circuitry comprises at least two issue queues to receive decoded instructions and from which the decoded instructions are issued to selected execution pipelines of the at least two execution pipelines for execution.

13. The apparatus as claimed in claim 1, further comprising a register bank comprising a plurality of registers, and wherein the write port shared by the at least two execution pipelines is arranged to write data to a register in the register bank.

14. The apparatus as claimed in claim 1, wherein the write port shared by the at least two execution pipelines is arranged to forward data to an execution pipeline of the at least two execution pipelines.

15. The apparatus as claimed in claim 1, further comprising a register bank comprising a plurality of registers, wherein in response to at least one control signal associated with the decoded instruction, the write port shared by the at least two execution pipelines is arranged to select one of:
a register in the register bank; and
an execution pipeline of the at least two execution pipelines, as the target of the write port.

16. A method of data processing comprising:
operating at least two execution pipelines, wherein at least one execution pipeline has a shorter execution latency than another execution pipeline;
receiving at least a decoded instruction part;
detecting a write port conflict condition in dependence on a latency indication associated with the at least a decoded instruction part;
issuing the at least a decoded instruction part to a selected execution pipeline of the at least two execution pipelines for execution; and
in response to detection of the write port conflict condition, when the selected execution pipeline has the shorter execution latency, causing the at least a decoded instruction part to proceed through at least one additional pipeline stage in addition to the selected execution pipeline,
wherein the at least one additional pipeline stage corresponds to a stage of an execution pipeline different from the execution pipeline that has the shorter execution latency.

17. Apparatus comprising:
at least two execution pipelines, wherein at least one execution pipeline has a shorter execution latency than another execution pipeline;
means for receiving at least a decoded instruction part;
means for detecting a write port conflict condition in dependence on a latency indication associated with the at least a decoded instruction part;
means for issuing the at least a decoded instruction part to a selected execution pipeline of the at least two execution pipelines for execution; and
means for causing the at least a decoded instruction part to proceed through at least one additional pipeline stage in addition to the selected execution pipeline in response to detection of the write port conflict condition when the selected execution pipeline has the shorter execution latency,
wherein the at least one additional pipeline stage corresponds to a stage of an execution pipeline different from the execution pipeline that has the shorter execution latency.

* * * * *